Aug. 11, 1931.  L. J. McCARTHY  1,818,809
AIRCRAFT
Filed Jan. 16, 1930   3 Sheets-Sheet 1
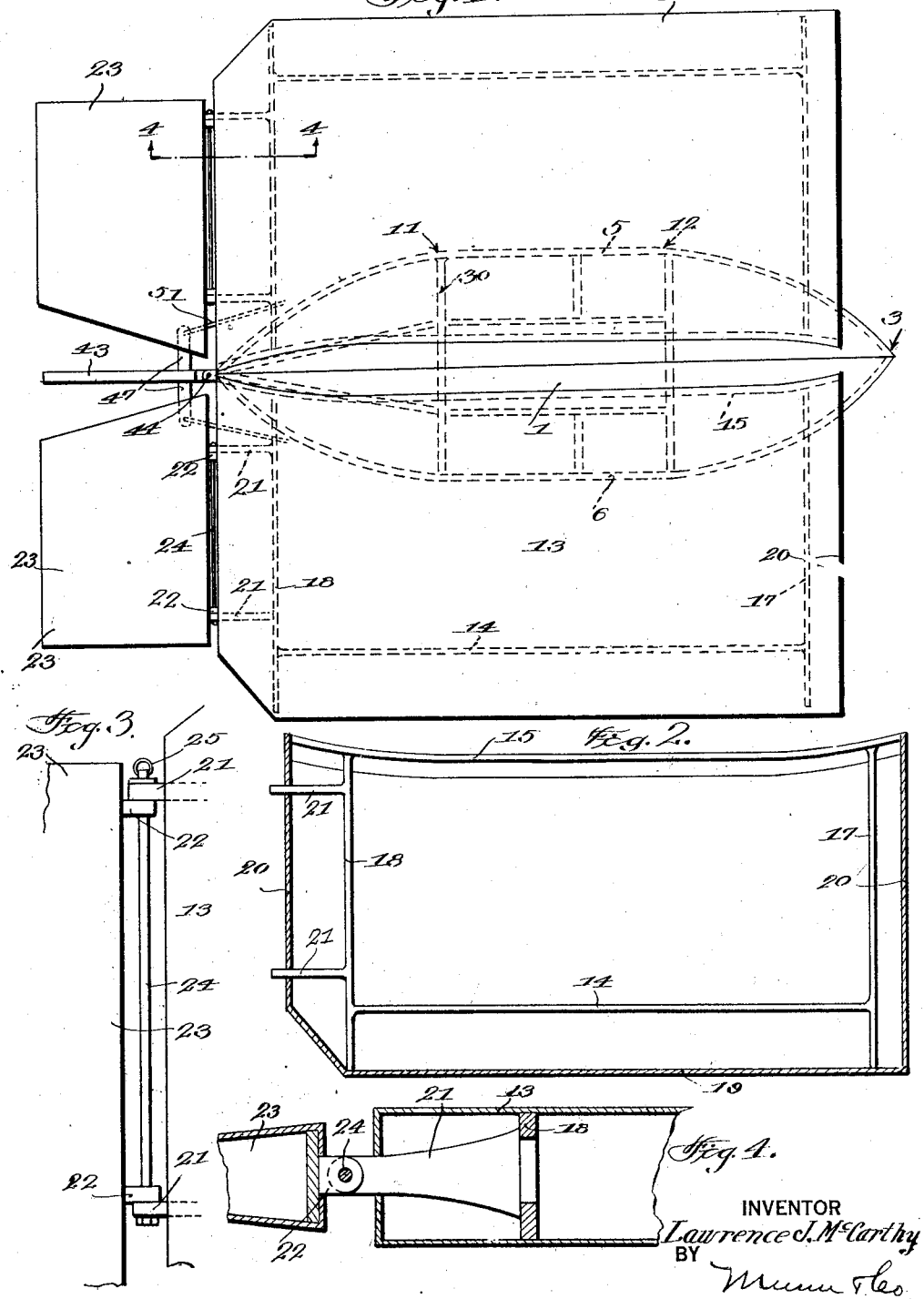
INVENTOR
Lawrence J. McCarthy
BY
ATTORNEY Aug. 11, 1931.   L. J. McCARTHY   1,818,809
AIRCRAFT
Filed Jan. 16, 1930   3 Sheets-Sheet 2
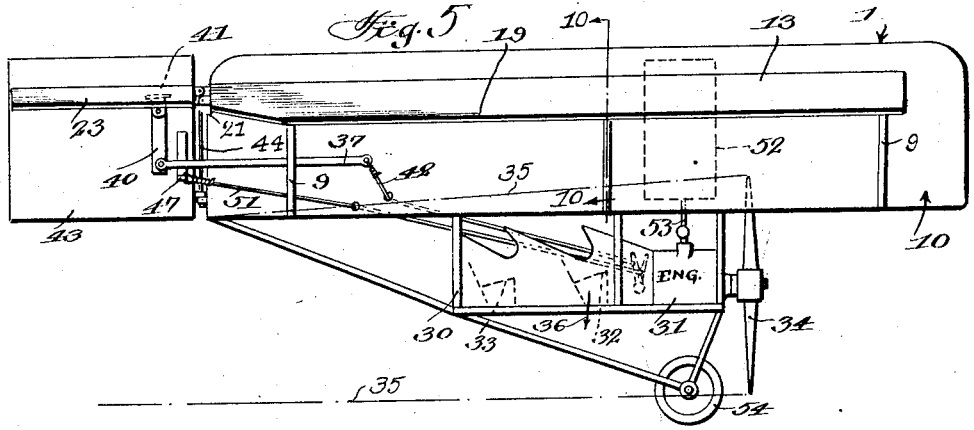
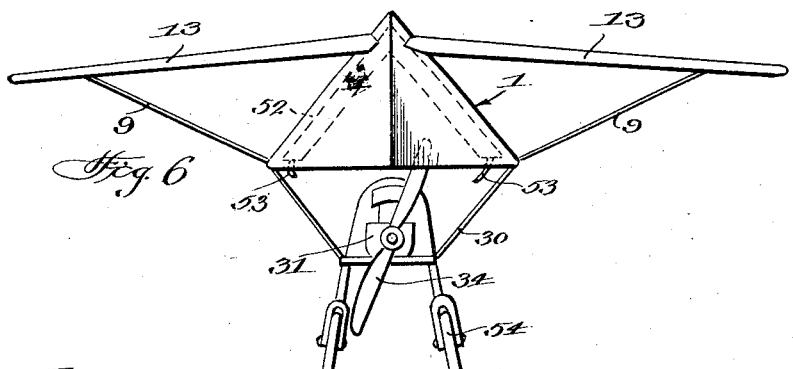
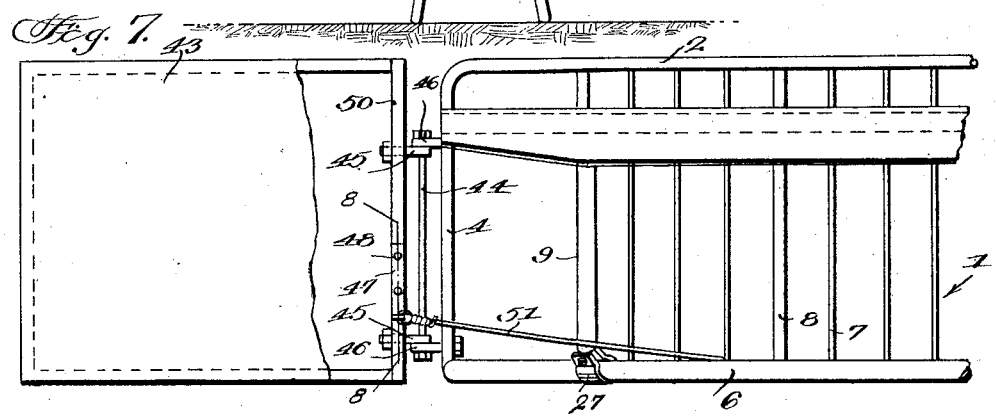
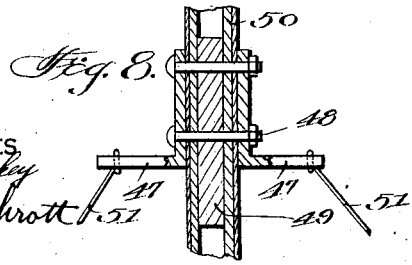
WITNESSES
INVENTOR
Lawrence J. McCarthy
BY
ATTORNEY

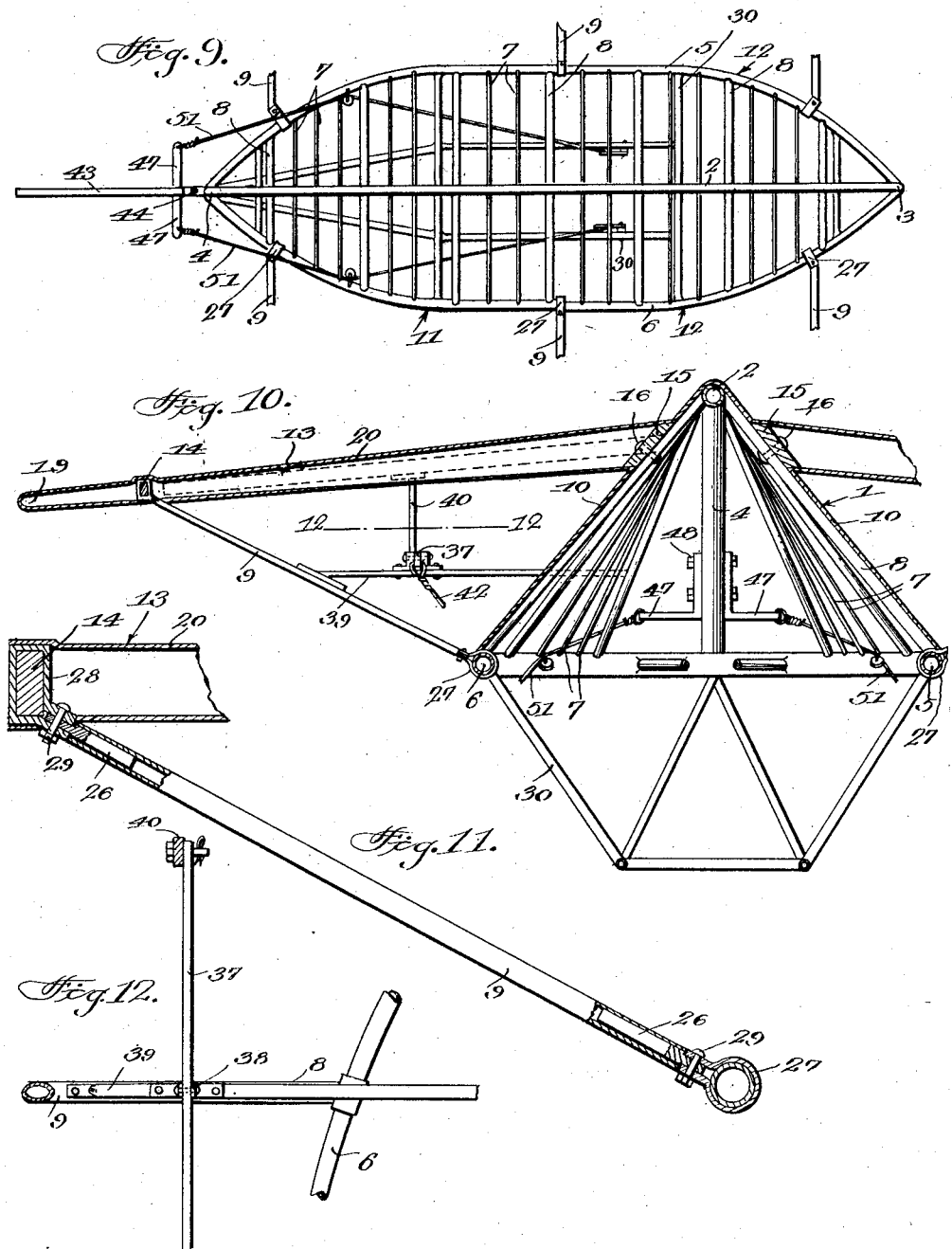

Patented Aug. 11, 1931

1,818,809

UNITED STATES PATENT OFFICE

LAWRENCE J. McCARTHY, OF OGDENSBURG, NEW YORK

AIRCRAFT

Application filed January 16, 1930. Serial No. 421,279.

This invention relates to improvements in aircraft and it consists of the constructions, combinations and arrangements herein described and claimed.

An object of the invention is to provide an aircraft, especially an airplane, an outstanding feature of which is the unique form of the fuselage which, being shaped like the inverted hull of a boat, has the particular advantage of acting on the principle of a parachute upon the necessity of a forced landing following engine trouble or the like in mid air.

Another object of the invention is to provide an aircraft in which the greatest extension of the wings is longitudinally of the fuselage instead of laterally as is customary, thus affording a much longer surface under which the compressed air stream must travel, materially augmenting the sustentation of the aircraft and rendering the structure so compact that a safe landing on a country road, city street, back yard, flat roof or other confined space is entirely possible, if necessary.

Other objects and advantages will appear in the following specification, reference being had to the accompanying drawings in which Figure 1 is a plan view of the improved aircraft.

Figure 2 is a plan view of the skeleton form of one of the wings, a portion of the covering being shown in cross section.

Figure 3 is a detail plan view illustrating the manner of hinging one of the elevators to an adjoining wing.

Figure 4 is a cross section taken on the line 4—4 of Figure 1, showing the foregoing hinge in more detail.

Figure 5 is a side elevation of the aircraft.

Figure 6 is a front elevation.

Figure 7 is a fragmentary side elevation confined solely to the showing of certain detailed structure of the fuselage and rudder.

Figure 8 is a section taken on the line 8—8 of Figure 7, illustrating the brackets of the rudder to which the steering cables are attached.

Figure 9 is a plan view of the skeleton form of fuselage.

Figure 10 is a cross section taken on the line 10—10 of Figure 5.

Figure 11 is a detail view of one of the wing struts, parts being shown in section.

Figure 12 is a cross section taken on the line 12—12 of Figure 10, illustrating the moving means of one of the elevators.

Even casual observers of the progress of aerial navigation must be convinced of the ultimate need of an aircraft so safe that persons of average intelligence and schooling in flying will be able to make use thereof precisely on the order of such persons' traveling about the congested streets of a city in automobiles.

Among the foremost considerations necessarily taken into account to the foregoing end is to make the aircraft "fool proof" so that the mechanically inclined owner of the tinkering variety will not readily be able to inflict some latent injury to the apparatus, later to develop into a serious fault while flying. Another important and perhaps fundamental purpose is to establish a low center of gravity and to make the fuselage in the form of an inverted hull of a boat so that a forced descent will be retarded and accomplished right side up.

These and other considerations are best understood by considering the drawings to which attention is now directed. The fuselage 1 is shaped over a skeleton frame (Figs. 7, 9 and 10) which gives it the form of an inverted hull of a boat. It comprises a ridge tube 2 (Figs. 7, 9 and 10) which merges into erect bow and stern standards 3 and 4 terminating at and being connected with corresponding points of bottom longerons 5, 6 (Fig. 9), shaped like the gunwale of a boat.

A plurality of minor stays or ribs 7 (Figs. 7 and 10) are interspersed with heavier ribs 8, certain joints of which with the longerons 5, 6 being selected, by virtue of the superior strength at these places, as the points of connection of the lower ends of a number of tubular wing struts 9.

A covering 10 is applied to the skeleton frame of the fuselage 1 somewhat on the order of Figure 10. The edges will be suitably secured along the longérons 5, 6, leaving the fuselage open at the bottom as shown. The sides of the fuselage converge toward the ridge tube 2, presenting a cross sectionally pyramidal form, the base of which is broader amidships in the zone between the points designated 11, 12 (Figs. 1 and 9) than the sides are high.

Thus the hollow fuselage is open at its base to the atmosphere. Air will be cupped up inside of the fuselage and especially when a forced landing is necessary, for example, when the engine becomes disabled in mid air, the aircraft will be enabled to descend almost vertically. The descent will be retarded by the action of the inverted fuselage somewhat on the order of that of a parachute. The pilot will be given the opportunity to regain his self-possession enough to accomplish any necessary manipulation of the various controls which will be provided to effect a good landing.

The latter result depends in no small measure on the wings 13 which are comparatively narrow (Fig. 1) and are longest in the longitudinal direction of the fuselage 1 to the sides of which they are connected at points some distance down from the ridge tube 2 (Fig. 10). The wings are supported at outward or downward angles of incidence by the previously mentioned struts 9, the upper ends of which are connected with outer spars 14 (Figs. 2, 10 and 11), comprising part of a skeleton frame.

This frame, in the instance of each wing (Fig. 2) includes an inner spar 15 which is applied directly to the side of the fuselage, hence shaped to agree with the longitudinal contour of the side at the point of connection. The connection will be made with the heavy stays or ribs 8 by means of rivets 16 or some other preferred equivalent. Front and rear lateral spars 17, 18 (Fig. 2) join the spars 14, 15 and extend some distance beyond the former to the wing tip 19. In practice it will be necessary to occupy the space between the spars 17, 18 with similar spars or ribs that will supply the necessary strength and maintain the shape of the wing when the covering 20 is applied.

Hinge knuckles 21 (Figs. 1 to 4) are firmly connected with the rear spar 18 as a base and extend from the trailing edge of each wing for connection with corresponding knuckles 22 of an adjoining elevator 23 by means of a hinge pin 24. This pin may have a head on one end (Fig. 3) and have a wire ring or cotter pin 25 inserted through the opposite end to insure its staying in place.

The tubular wing strut 9 (Fig. 11) has fillers 26 secured in its ends to provide places of sufficient strength where bands 27, 28, respectively applied to one of the bottom longérons and to the outer spar 14, are secured by means or rivets or bolts 29. The use of the bands 27 is optional to welding the wing struts at the points of connection with the bottom longérons.

At this point it is deemed well to state that welding may be resorted to with good effect wherever a permanent metallic connection is to be made. For example, the standards 3, 4 would be welded to the bow and stern of the skeleton frame. The ribs 7, 8 would be welded to the ridge tube 2 and longérons 5, 6. Respecting the coverings 10, 20, these will comprise any desired material and will be applied in any manner which will bring about the best result.

An underslung frame 30 is suspended from the longérons 5, 6 (Figs. 1, 5, 6 and 9) by virtue of the connection of its members with the longérons according to the mode already suggested. This frame will be enclosed in practice, and although Figure 5 does not illustrate the enclosure a division of the space for the engine 31, pilot seat 32 and passenger seat 33 is suggested by appropriate showings.

It is to be observed in Figures 5 and 6 that a portion of the circumference of the revolution of the propeller 34 occurs within the fuselage 1. This has two effects. First, the upper portion of the air stream 35 (Fig. 5), namely that portion occurring within the bottom of the fuselage, defines an area of demarcation between the air within the fuselage and that beneath it. In other words, the air stream 35 is under such force that it will drive straight back and avoid the formation of eddy currents within the fuselage.

Second, by having the propeller tips extend within the region of the fuselage during rotation it becomes possible to bring the underslung frame 30 that much closer to the nether part of the fuselage. The relationship of the underslung frame to the fuselage provides a low center of gravity, this being approximately situated at the arrow 36 (Fig. 5).

The inverted fuselage provides a hood over the underslung frame and the practically full length of the wings 13 adds further to the protection of the underslung frame as well as of whatever cargo it may be carrying. Should the latter be a pilot and observer in war time the substantially central location of the seats 32, 33 in reference to the peripheral contour of the aircraft makes them practically invulnerable to an attack.

The moving means of each of the elevators 23 (Fig. 5) comprises a bar 37 pivoted at 38 (Figs. 10 and 12) to a support 39 fixed at its ends between an aligning rib 8 and spar 9. The rear end of the bar has connection by means of a link 40 with a hinge 41 fixed beneath the elevator, while the front end of the bar has connection with a cable 42 (Figs. 5 and 10) leading to a suitable control. There will be duplicate moving means for the two elevators.

A rudder 43 situated between the elevators 23 (Fig. 1) has a hinge pin 44 (Fig. 7) which makes connection between hinge knuckles 45, 46 respectively carried by the rudder and the stern standard 4. Brackets 47, affixed by means 48 at a place 49 where the frame 50 is reinforced, have cables 51 leading from the extremities to a suitable control also not shown.

Fuel for the engine is carried by a gas tank 52 (Figs. 5 and 6) which is situated in the fuselage 1 and is substantially shaped like it. The gas tank may be as long as desired, depending of course upon the amount of fuel intended to be carried. It has one or more pipes 53 (Figs. 6) leading to the carbureter of the engine.

The foregoing description is devoted largely to the general principle of the aircraft. No attempt has been made to incorporate the numerous details which must be taken into account in the actual construction thereof. For example, the merging points of the ridge tube 2 with the bow and stern standards 3, 4 are shown somewhat rounded (Figs. 5 and 7) while in practice the rounding may be more pronounced or these points might form perfect right angles.

Again, the bottom longérons 5, 6 are shown level, that is to say, situated in a common plane. Practice may dictate the necessity of dipping the bow end of the longérons in the downward direction so as to afford a greater measure of protection for the passengers although when the necessity for unimpeded visuality is considered it might be deemed preferable to keep the construction as it is.

The advantages are readily understood. As already stated, the fuselage 1 resembles the inverted hull of a boat. It is pyramidal in cross sectional form. The base is broadest in the zone between the points 11, 12, (Figs. 1 and 9) but gradually diminishes by virtue of the tapering of the skeleton frame toward the bow and stern.

The wings 13, instead of extending far out beyond the sides of the fuselage as in prevailing types of airplanes, are very short but extend substantially full length of the fuselage. They are placed on downward angles of incidence (Fig. 6) thus augmenting the function of the hollow, open-bottomed fuselage in descending upon an engine failure.

It is possible to house the aircraft in a very narrow hangar by virtue of the laterally short wings 13. This type of wings also extends the nether supporting area substantially full length of the fuselage. The longitudinal wings should afford greater lifting power than the conventional crosswise wings, because they afford more area with less extension. This particular type of wings is especially adapted to the new type of fuselage.

The components of the fuselage and wings makes it possible for an airplane thus equipped to land safely and readily in any confined space, for example, a country road, flat roof, etc. The design of the fuselage and wings makes it possible to sustain the aircraft at an extremely low rate of flying speed thus making it possible to employ a low speed engine, the operation of which can be carried on with utmost economy.

The inherent stability of the aircraft is achieved by the low center of gravity 26. The structure is balanced thus making it utterly impossible for the occurrence of freak movements such as rolling, tail spinning, nose diving, side slipping, etc., such as are common in the known types of airplanes. Even should both wings 13 become disabled it would still be possible to make a safe landing with the parachute-like fuselage.

I claim:—

1. In an aircraft, a fuselage simulating the inverted hull of a boat and comprising bow and stern standards toward which the covered sides are sloped, the bottom of the fuselage being open.

2. In an aircraft, a fuselage having flat sides and simulating the inverted hull of a boat thus presenting a ridge from bow and stern, and wings attached to said sides immediately adjacent to the ridge.

3. In an aircraft, a wing comprising a covering and a skeleton frame which includes a lateral spar, hinged knuckles carried by the spar and protruding from the covering at one edge of the wing, and an elevator hinged to the protruding portions of said knuckles.

4. In an aircraft, a fuselage including ribs, a wing including an inner spar conforming to the shape of a side of the fuselage, and means to secure the inner spar to said ribs.

5. In an aircraft, a fuselage comprising longérons shaped substantially like the gunwale of a boat, a ridge tube having bow and stern standards connected with the extremities of the longérons, a fuselage of minor stays with interspersed heavier ribs connecting the ridge tube with the longérons providing slanting fuselage sides, wings having frames including inner spars conforming in shape to the slanting sides in the longitudinal direction of the fuselage, means to secure the spars to the ribs, and struts extending from the wings to the longérons adjacent to the points of connection therewith of selected ribs.

6. In an aircraft, a fuselage including a longéron, a ridge tube, ribs connecting the longéron and ridge tube, a wing having a skeleton frame including outer and inner spars the latter being secured to the ribs, and a strut joined at its ends with the outer spar and with the longéron adjacent to the point of connection of a selected rib.

7. In an aircraft, a fuselage having bottom longérons shaped like the gunwale of a boat, a ridge tube having vertical bow and stern standards connected with the extremities of the longérons, and a plurality of stays and ribs extending between and connected with the ridge tube and longérons, providing a frame of cross sectionally pyramidal shape.

8. In an aircraft, a fuselage having an open base, an underslung frame, and an engine carried by the frame having a propeller, a portion of the circumference of revolution of which occurs through the open base and within the fuselage.

LAWRENCE J. McCARTHY.